United States Patent [19]
Mitsuhashi et al.

[11] Patent Number: 5,537,131
[45] Date of Patent: Jul. 16, 1996

[54] CHARACTER GENERATING METHOD AND APPARATUS

[75] Inventors: Hiroki Mitsuhashi; Shinichiro Motokado, both of Kawasaki; Mutsumi Ohtomo, Sapporo, all of Japan; Hellmann Antonius, Frankfurt, Germany

[73] Assignee: Fujitsu Limited, Kanagawa, Japan

[21] Appl. No.: 225,959

[22] Filed: Apr. 8, 1994

[30] Foreign Application Priority Data

May 24, 1993 [JP] Japan .................... 5-145589

[51] Int. Cl.⁶ .................................... G09G 1/06
[52] U.S. Cl. .................. 345/128; 345/127; 345/129; 345/130; 345/141
[58] Field of Search .................. 345/127, 128, 345/129, 130, 131, 143, 141, 144, 202, 192, 193, 194; 358/528; 395/151, 150

[56] References Cited

U.S. PATENT DOCUMENTS

| | | | |
|---|---|---|---|
| 4,897,638 | 1/1990 | Kokunishi | 345/128 |
| 5,079,724 | 1/1992 | Shiraki | 345/127 |
| 5,295,240 | 3/1994 | Kajimoto | 345/127 |

FOREIGN PATENT DOCUMENTS

| | | |
|---|---|---|
| 6491178 | 4/1989 | Japan . |
| 4174898 | 6/1992 | Japan .................... 345/128 |
| 56164 | 1/1993 | Japan . |

*Primary Examiner*—Curtis Kuntz
*Assistant Examiner*—Minsun Oh

[57] ABSTRACT

In a character generating method and an apparatus for converting outline data of a character to coordinates of a desired character size to generate a bit map image of that character size, each piece of outline coordinate data expressing a contour line of the character in logical coordinates is converted into coordinates of the designated size. The method further comprises replacing converted coordinates of designated points on the contour line with coordinates on a reference line determined by coordinates of specific reference points and rounding the individual converted coordinates of the contour and converting the rounded coordinates line into physical coordinates expressed by integers. The apparatus has a font memory for storing outline font data expressing a contour line of the character in coordinates, a character developing circuit for reading each piece of outline data from the font memory, converting the read outline data into coordinates of a designated size, replacing converted coordinates of designated points on the contour line with coordinates on a reference line determined by coordinates of specific reference points, rounding the individual converted coordinates of the contour line, and converting the rounded coordinates into physical coordinates expressed by integers. A drawing circuit is provided for generating a bit map image of the character from the converted physical coordinates.

58 Claims, 12 Drawing Sheets

UPPER REFERENCE LINE
LOW REFERENCE LINE

UPPER REFERENCE LINE
LOW REFERENCE LINE

CHARACTER GENERATING METHOD AND APPARATUS

BACKGROUND OF THE INVENTION

1. Field of the Invention

The present invention relates to a character generating method and apparatus for developing an outline character, expressed by a logical coordinate system, on physical coordinates expressed by integer values.

2. Description of the Related Art

A printer, a display device or the like requires that character patterns be generated to print or display characters. In the generation of character patterns, recently, characters of various character sizes are demanded even for the same character. Therefore, the memory capacity increases if characters of various character sizes are given for the same character, particularly, for Kanji characters or the like which have many types of characters.

As a solution to this problem, an outline font system has been proposed. According to this system, data of character patterns whose contour lines are expressed in real numbers and also by a logical coordinate system, is provided, and this data is converted to a designated character size coordinate system to develop characters to a bit map image expressed by integer values.

It is demanded that characters should be restored to the original designs with high fidelity even after enlargement or reduction.

FIGS. 11A, 11B, 12A and 12B are explanatory diagrams of prior art.

Conventionally, in developing logical coordinate data expressed by real numbers, such as a figure or an outline font, to a bit map image expressed by integer values, a fractional portion of character data is rounded so that the data will be expressed in the units of pixels of a printer or a display. In order to express coordinate data by closest pixels, rounding is typically performed to count fractions of 5 and over as a whole number.

For example, individual contour points which constitute a Mincho Kanji character "Ichi" (meaning "one") expressed in an outline form as shown in FIG. 11A, are stored by integer logical coordinates like 1000×1000. Character outline data on the logical coordinates are converted to the necessary character size to have coordinate values including decimal points. If all the points are rounded to express the coordinate values by physical coordinates, all the points will be rounded to the nearest whole numbers.

For example, the character "Ichi" in FIG. 11A is a horizontal stroke and is broken down into a stroking start portion, a stroking sustain portion and a stroking end portion. In this case, the stroking start portion on the left end of the character "Ichi" in FIG. 11A is converted into coordinates as shown in FIG. 11B if it is reduced to a character size of 50×50 dots. This stroking start portion consists of six points a, b, c, f, e and d in the clockwise direction. To reduce those six points in the 50×50 character size, the point a is converted through the reduction process to coordinate values X=2.4, Y=27.6, which contain fractions.

To round all the points to integers so that they can be expressed by physical coordinates, those points are rounded to the nearest integers as shown in FIG. 12A. For example, the contour point a is rounded to coordinate values of X=2, Y=28. The rounded contour points are then developed into a dot-based bit map image as shown in FIG. 12B.

For the illustrated pattern of the Kanji character "Ichi" whose stroking start portion on the left end has a triangular portion protruding or extending downward, this extending portion is expressed by one pixel in a reduced character. The same applies to the extending portion of the stroking end portion of a vertical stroke or the stroking start portion and stroking end portion of an oblique stroke.

According to the prior art, however, after the outline coordinates are reduced or enlarged and then rounded, the triangular extending portion of the stroking start portion of a horizontal stroke or the extending portion of a vertical stroke appears protruding by one pixel. Therefore, the bit map image of the character which is developed on the physical coordinates would appear significantly different from the original image and would be too emphasized, thus deteriorating the character quality. This tendency is prominent particularly for characters of a small size.

SUMMARY OF THE INVENTION

It is therefore a primary object of the present invention to provide a character generating method and apparatus which prevent the generation of a bit map image which is very different from the original image when a character including an extending portion or the like is developed on physical coordinates.

It is another object of the present invention to provide a character generating method and apparatus which can generate characters of a small size based on outline coordinates without causing the extending portions or the like of the small characters to have bit map images very different from the original character images.

To achieve the above objects, according to one aspect of the present invention, there is provided a character generating method for generating a bit map image of a character of a designated size from outline data of the character, which method comprises the steps of converting each piece of outline coordinate data expressing a contour line of the character in logical coordinates, into coordinates of the designated size; replacing converted coordinates of designated points on the contour line with coordinates on a reference line determined by coordinates of specific reference points; rounding the individual converted coordinates of the contour and converting the rounded coordinates line into physical coordinates expressed by integers; and generating a bit map image of the character from the converted physical coordinates.

According to another aspect of the present invention, there is provided a character generating apparatus for generating a bit map image of a character of a designated size from outline data of the character, which apparatus comprises a font memory for storing outline font data expressing a contour line of the character in coordinates; a character developing circuit for reading each piece of outline coordinate data from said font memory, converting the read outline coordinate data into coordinates of a designated size, replacing converted coordinates of designated points on the contour line with coordinates on a reference line determined by coordinates of specific reference points, rounding the individual converted coordinates of the contour line, and converting the rounded coordinates into physical coordinates expressed by integers; and a drawing circuit for generating a bit map image of the character from the converted physical coordinates.

As an extending portion or the like of a character becomes too emphasized when expressed in a small size, the coordinates of the contour points of this extending portion are converted to coordinate values which are not too emphasized according to the present invention. In the present invention, reference contour points are set and a reference line is determined by the enlarged or reduced coordinates of the reference contour points. The character generating process of the present invention has an additional process of replacing designated coordinates of contour points with the corresponding coordinates on this reference line. This processing will replace the coordinates of an extending portion with the corresponding coordinates on a reference line to thereby prevent the extending portion from being too emphasized.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

Figure 1:
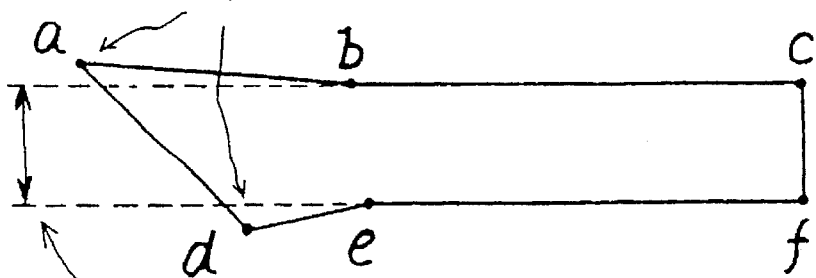
FIG. 1 is a diagram of the principle of the present invention.
Figure 1:
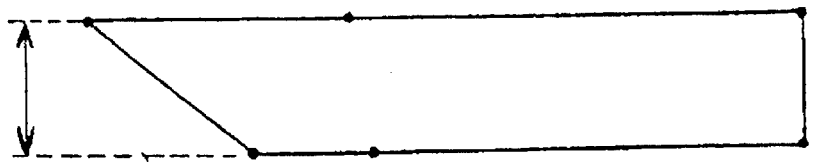
Figure 1:
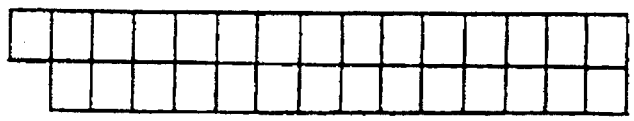

FIG. 1 illustrates the principle of the present invention.

The present invention will generate characters each having a stroke with an extending portion as shown in FIG. 1. The outline coordinates of the illustrated stroke are converted to coordinates of a designated character size. The extending portion has coordinate point a and d which are previously know. The coordinate points a and d are replaced with corresponding coordinates on a reference line for that stroke. With the use of this conversion scheme, even if a character having an extending portion is converted to a small size, the extending portion is not too emphasized in the obtained character pattern.

Figure 2:
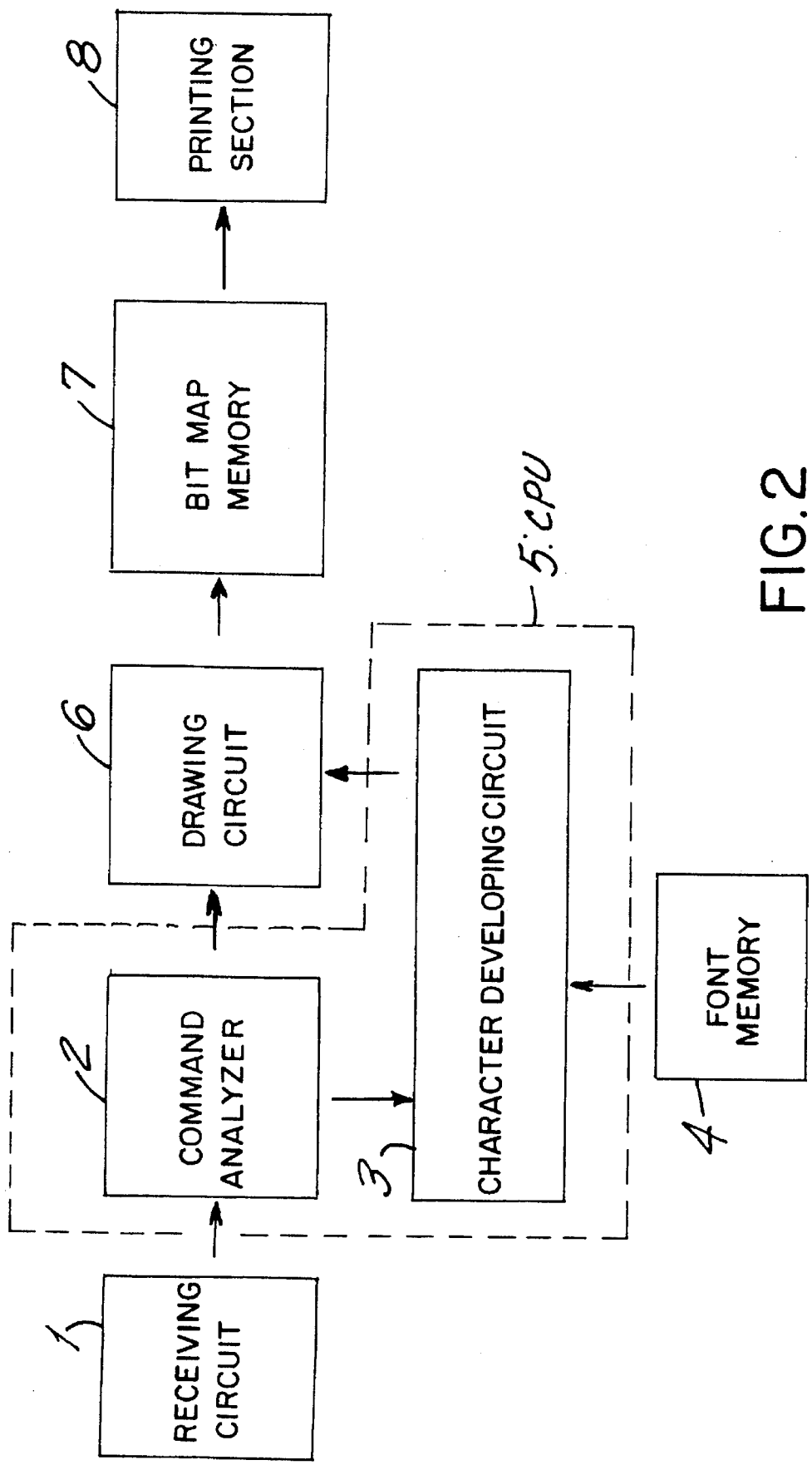
FIG. 2 is a block diagram showing one embodiment of the present invention.
Figure 3:
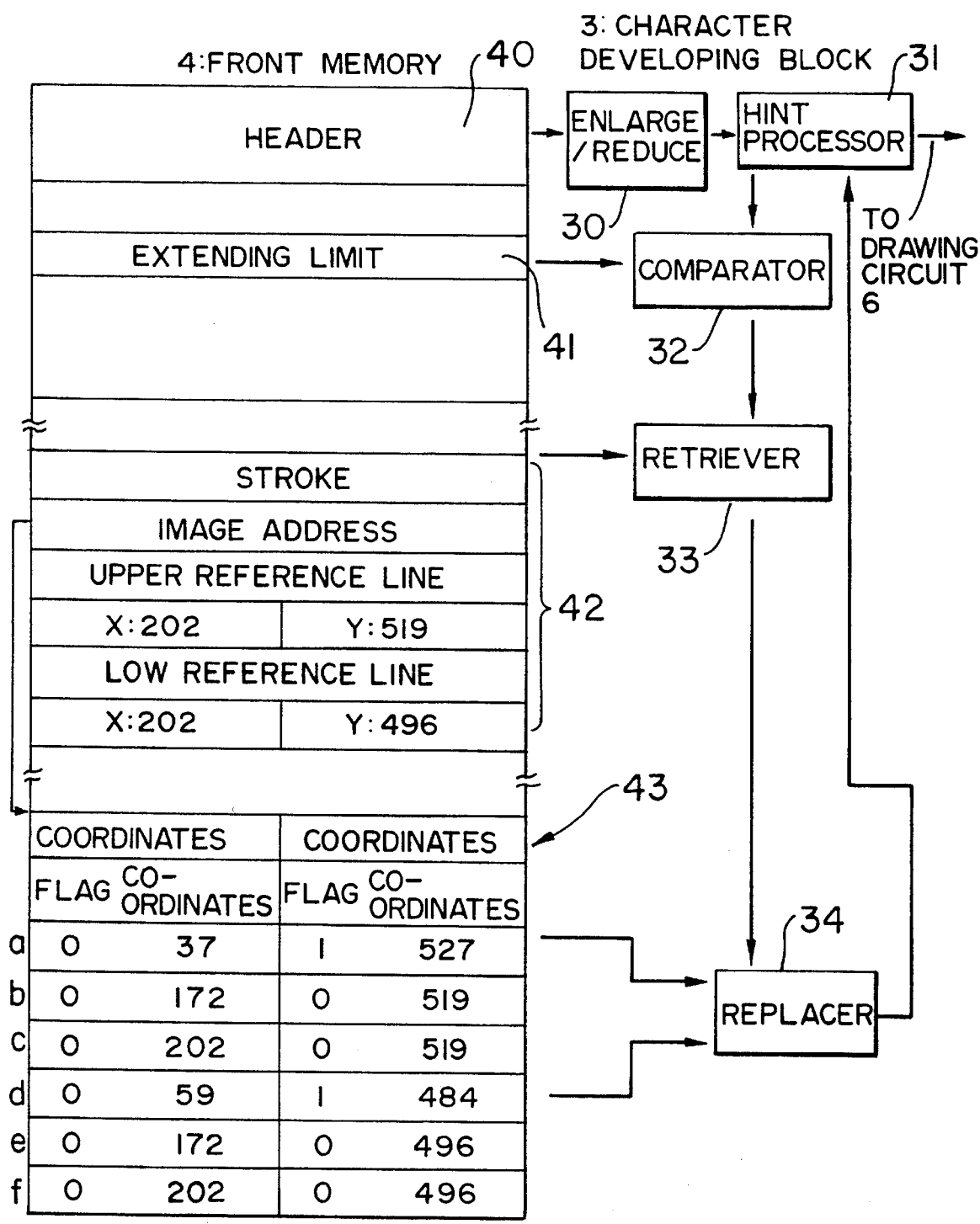
FIG. 3 is a block diagram showing the essential portions in FIG. 2.

FIG. 2 is a block diagram showing one embodiment of the present invention, FIG. 3 is a block diagram showing the essential portions in FIG. 2 and FIGS. 4A through 4D are diagrams for explaining the operation of this embodiment.

Referring to FIG. 2, a receiving circuit 1 receives a print command and print data from a higher-level device (computer or the like). A command analyzing block 2 analyzes the meaning of the print command, etc. received at the receiving circuit 1, and separates the received data to a character and a figure.

A character developing block 3 receives a character code, character size and a character direction (vertical, horizontal, or the like) from the command analyzing block 2, reads character data from a font memory 4, and develops the associated character to a bit map image. This character developing block 3 will be described in detail later with reference to FIG. 3. The font memory 4 stores characters in an outline form, and will be described in detail later with reference to FIG. 3.

A CPU (character developing circuit) 5 executes the operations of the command analyzing block 2 and the character developing block 3. That is, the command analyzing block 2 and the character developing block 3 are the block expression of the program the CPU 5 runs.

A drawing circuit 6 developed character to a bit map image, overlaps the character and figure, which have been developed to bit map images, one on the other, and writes the resultant image in a bit map memory 7. The drawing circuit 6 is constituted of a known drawing LSI. A printing mechanism 8, which is a page printer like an electrophotographing printer, prints data in the bit map memory 7 on a sheet of paper.

The operation of this embodiment will now be described. The meanings of the print command and print data received at the receiving circuit 1 are analyzed by the command analyzing block 2, and are separated into a character and a figure. A figure and an image are developed to bit map images by the drawing circuit 6. A character is developed to a bit map image of the designed character size by the character developing block 3, using outline font data stored in the font memory 4. The drawing circuit 6 overlaps the character and figure, which have been developed to bit map images, one on the other, and writes the resultant image in the bit map memory 7. The data in the bit map memory 7 will be printed on a sheet of paper by the printing mechanism 8.

FIG. 3 presents the detailed illustration of the character developing block 3. An enlarging/reducing circuit 30 performs an enlarging/reducing operation so that character outline data corresponding to the character code from the font memory 4 becomes the designed character size. A hinting block 31 performs coordinate replacement of data before hinting (replacing), performs rounding (hinting) or the like and then outputs integer coordinate values of contour points of interest.

A comparator 32 compares the limit (character size) of extending portions (hereinafter referred to as "extending limit") in the font memory 4, with the designated character size. When the character size is equal to or smaller than the extending limit, the comparator 32 instructs the execution of coordinate replacement. A retriever 33 searches the contour data in the font memory 4 for all the points which have data of extending portions. A replacing unit 34 replaces the coordinates of the retrieved points of the extending portions to corresponding coordinates on an upper reference line or a lower reference line, whichever is closest, in the font memory 4, and rewrites the data in the hinting block 31.

The font memory 4 includes a header block 40 where the type of a character set (Mincho, Gothic, etc.) and common data, such as the prepared date, are stored. Following this header block 40 is an area for an extending limit (character size) 41 which is stored as control data of the character set.

Provided at the positions corresponding to individual character codes in the font memory 4 are stroke blocks 42 each of which stores the type of strokes constituting each character, an image address at which data of the contour points of each stroke are stored, upper reference line data, lower reference line data, etc.

Outline or contour data blocks 43 each of which stores coordinate values of contour points that form each part of each stroke, are provided at the locations indicated by the image addresses.

The character developing block 3 is constituted of the CPU 5 as mentioned above, and those blocks 30 to 34 are software-based functional blocks.

Figure 4A:
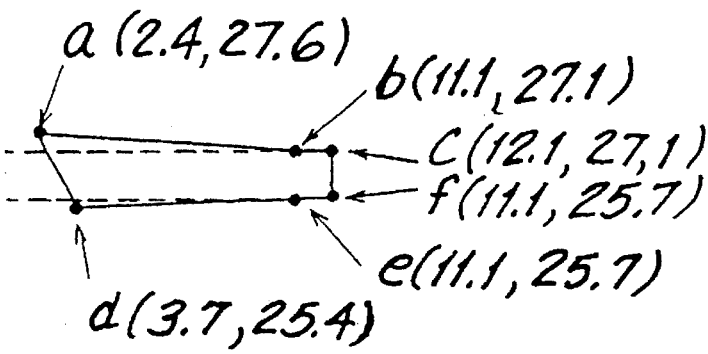
FIG. 4 is diagrams for explaining the operation of this embodiment.

The operation of this embodiment will now be described with reference to the parts of the stroking start portion of the Kanji character "Ichi" shown in FIG. 4A. As shown in FIG. 4A, the parts are formed by contour points a, b, c, d, e and f. The logical coordinates of the individual contour points are stored in the associated contour data block 43 in the font memory 4, as shown in FIG. 3.

For each contour point, this contour data block 43 stores data of an extending portion and its logical coordinates. The extending-portion data consists of X-directional extending-portion data and Y-directional extending-portion data, which are stored in the form of a flag. In the diagram, as the points a and d are the contour points of the extending portion, a flag "1" indicating the presence of an extending portion is stored at the locations of their coordinates. Since the extending portion extends in the Y direction in this example, the extending-portion data flag of the Y coordinate is stored as control data of the Y coordinate.

The stroke block 42 for the stroke constituted by those parts stores an image address that indicates the outline data block for the parts. The stroke block 42 further stores reference line data of this stroke. this reference line data determines the direction of a stroke. For a horizontal stroke, the reference line data is the coordinates of a horizontal line that passes a certain point. For a vertical stroke, the reference line data is the coordinates of a vertical line that passes a certain point. For an oblique stroke, the reference line data is the coordinates of an oblique line that passes two points.

As the example shown in FIG. 4A is a horizontal stroke having a predetermined width, the upper reference line indicating the upper portion of the width of the horizontal stroke and the lower reference line indicating the lower portion are stored. In the example shown in FIG. 4A, the upper reference line is the contour point c and the logical coordinates of this point c is stored as the upper reference line data. The lower reference line of the horizontal stroke is the contour point f and the logical coordinates of this point f is stored as the lower reference line data.

The operation of the structure as shown in FIG. 3 will be discussed below. When a character code to be developed is given to the character developing block 3, this block 3 searches the stroke block 42 in the font memory 4, which corresponds to the designed character code. The character developing block 3 obtains the address of the contour data block 43 of the associated parts from the image address stored in this stroke block 42, and reads the logical coordinates of the individual contour points.

Then, the enlarging/reducing circuit 30 multiplies the logical coordinates of each contour point by the given character size (reduction/enlargement factor) to compute the contour coordinates for the designated character size. As the reduction factor is 1/15 in the X direction and is 1/19 in the Y direction in this example, the contour coordinates of the contour point a become X=37/15=2.4 and Y=527/19=27.6. Similarly, the logical coordinates of the other contour points in the contour data block 43 in the font memory 4 shown in FIG. 3 will be converted to corresponding contour coordinates for the designated character size as shown in FIG. 4A.

The conversion results are sent to the hinting block 31. The hinting block 31 store the X and Y coordinates of the individual contour points shown in FIG. 4A in a table.

The contents of this table are as follows.

contour point a X=2.4 Y=27.6 contour point b X=11.1 Y=27.1 contour point c X=12.1 Y=27.1 contour point d X=3.7 Y=25.4 contour point e X=11.1 Y=25.7 contour point f X=12.1 Y=25.7

The hinting block 31 sends the reduction/enlargement factor to the comparator 32. The comparator 32 reads the extending limit 41, determined for the character set of this character in question, from the font memory 4. The comparator 32 compares the extending limit with the designated reduction/enlargement factor. If the extending limit is set to 1/10, for example, the designated reduction/enlargement factor is smaller than this value, the replacing process is performed. When the designated reduction/enlargement factor is equal to or above the extending limit, no replacing process will be executed.

In the replacing process, the retriever 33 refers to the extending-portion flags of the coordinates of each contour point in the contour data block 43 in the font memory 4 to obtain the contour points and extending direction (X or Y direction) of the extending portion in response to an instruction from the comparator 32.

The replacing block 34 sends the contour points having data of this extending portion, the direction of the extending portion and the aforementioned reference line data to the hinting block 31 and instructs the coordinate replacement. As the extending portion extends in the Y direction at the contour points a and d in this example, those data together with the upper reference line data and lower reference line data are sent to the hinting block 31.

The hinting block 31 multiplies the upper reference line data and lower reference line data by the designated reduction/enlargement factor to compute the coordinates of the upper reference line data and lower reference line data for the designated reduction/enlargement factor. In this example, the coordinates are the converted coordinate values of the contour points c and f.

Then, the coordinates of the extending portion at the two contour points a and d in question are replaced with the coordinates of the upper reference line or the lower reference line, whichever is the closest. For instance, as the extending portion extends in the Y direction at the contour point a, the Y coordinate of the contour point a (=27.6) is compared with the Y coordinate of the upper reference line (=27.1) and the Y coordinate of the lower reference line (=25.7) and is replaced with the closest coordinate. Therefore, the Y coordinate of the contour point a, Y=27.6, is replaced with the Y coordinate of the upper reference line, Y=27.1.

Figure 4B:
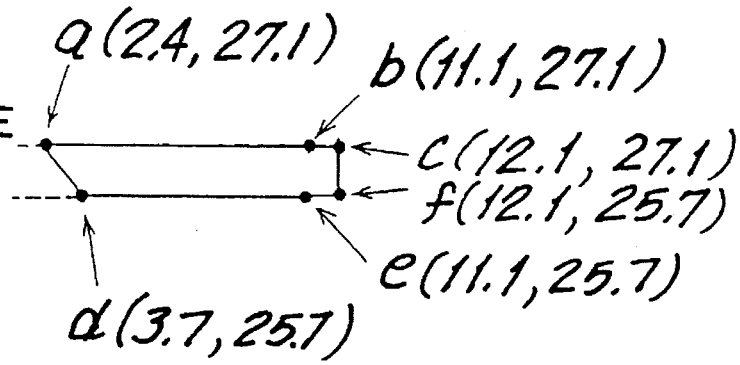

Through this replacing process, the individual points a to f have the following converted coordinates as apparent from FIG. 4B.

contour point a X=2.4 Y=27.1 contour point b X=11.1 Y=27.1 contour point c X=12.1 Y=27.1 contour point d X=3.7 Y=25.7 contour point e X=11.1 Y=25.7 contour point f X=12.1 Y=25.7

Figure 4C:
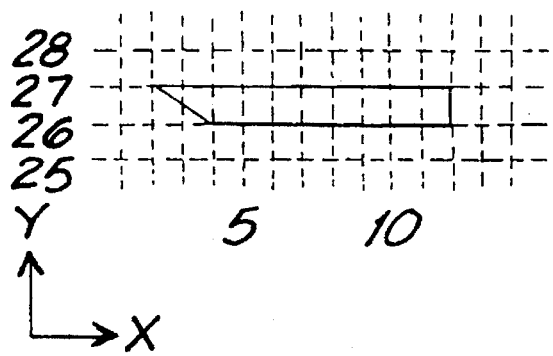

The hinting block 31 executes the replacing processing in the above manner and performs the width adjustment and other necessary processing to improve the character quality of the bit map image. Then, the hinting block 31 performs rounding on the coordinates of the individual contour points. The integer coordinates of the individual contour points after rounding become as follows, which are shown in FIG. 4C.

contour point a X=2 Y=27 contour point b X=11 Y=27 contour point c X=12 Y=27 contour point d X=4 Y=26 contour point e X=11 Y=26 contour point f X=12 Y=26

Figure 4D:
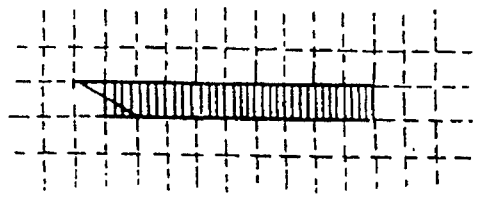

The integer coordinates of those contour points are sent to the drawing circuit 6. The drawing circuit 6 performs drawing to fill inside the contour line, completing the bit map image as shown in FIG. 4D.

In converting a stroke or parts constituting a character to a smaller character size, the contour points are compensated to the points on the reference lines in the above-described manner so that the extending portion of the stroke or each part will not be too emphasized. This scheme will prevent the generation of a bit map image with a poor quality in which the extending portion of a stroke forming this character is emphasized.

Since the compensation is performed on characters of a small size whose extending portions are likely to be emphasized, larger characters whose extending portions are not easily emphasized will have the coordinates unchanged. Accordingly, the character images can be saved completely.

Further, the reference line data and extending-portion data are stored as hinting data in the font memory, so that the extending portion will easily be distinguished from the reference line data, thus facilitating the compensation.

Again, extending portions are too emphasized for small character sizes equal to or below a certain size, not all the character sizes. According to the present invention, therefore, it is determined whether or not the above-described coordinate conversion should be executed in accordance with the designated character size.

The generation of a bit map image with the extending portion too emphasized is prevented by performing the coordinate conversion for this extending portion, with the target points for replacement treated as the contour points of an extending portion. Further, as the contour points to be replaced are designated and stored in advance in the font memory 4, the replacing process can be executed easily.

Figure 5:
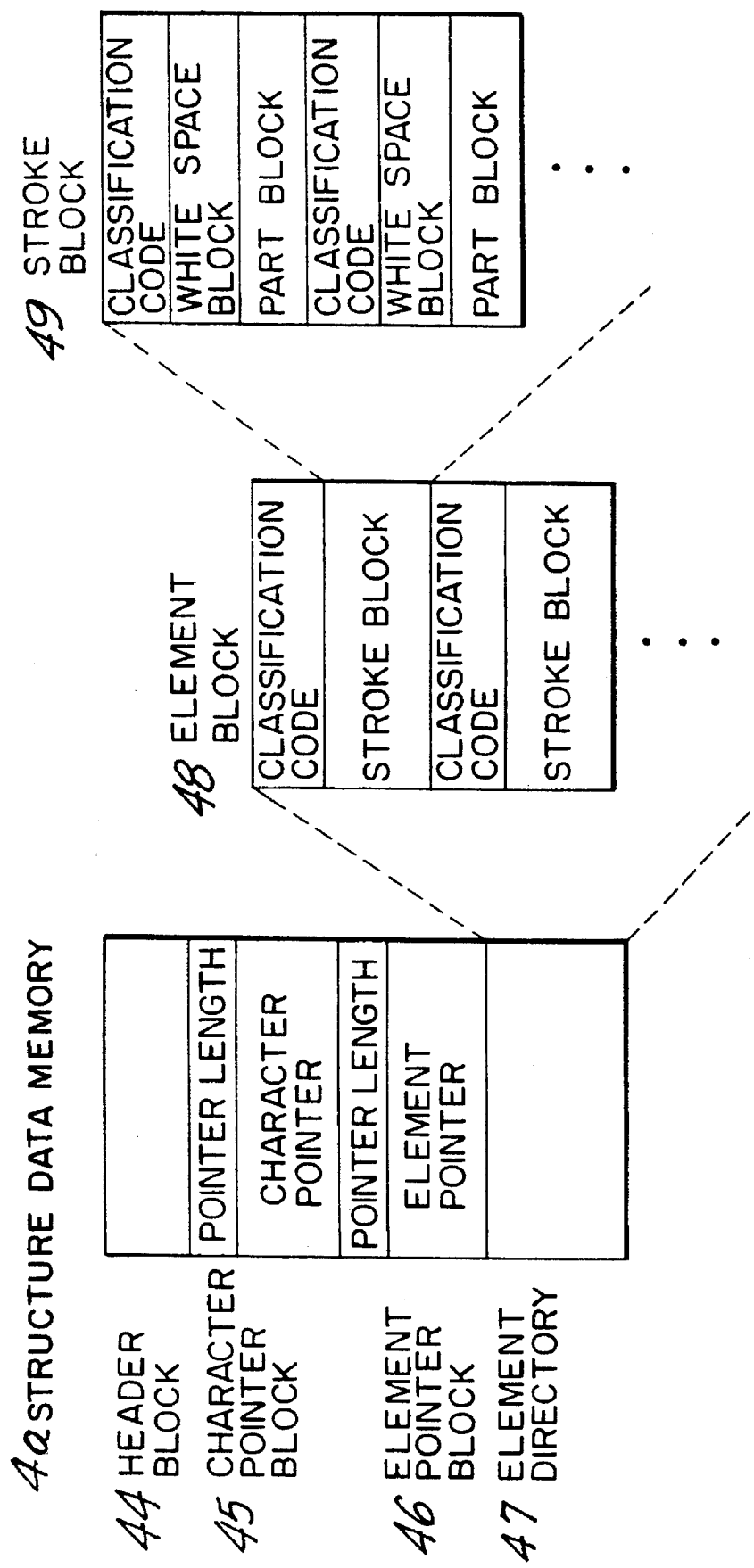
FIG. 5 is a structural diagram of a structure data memory in a font memory according to a modification of the present invention.
Figure 6:
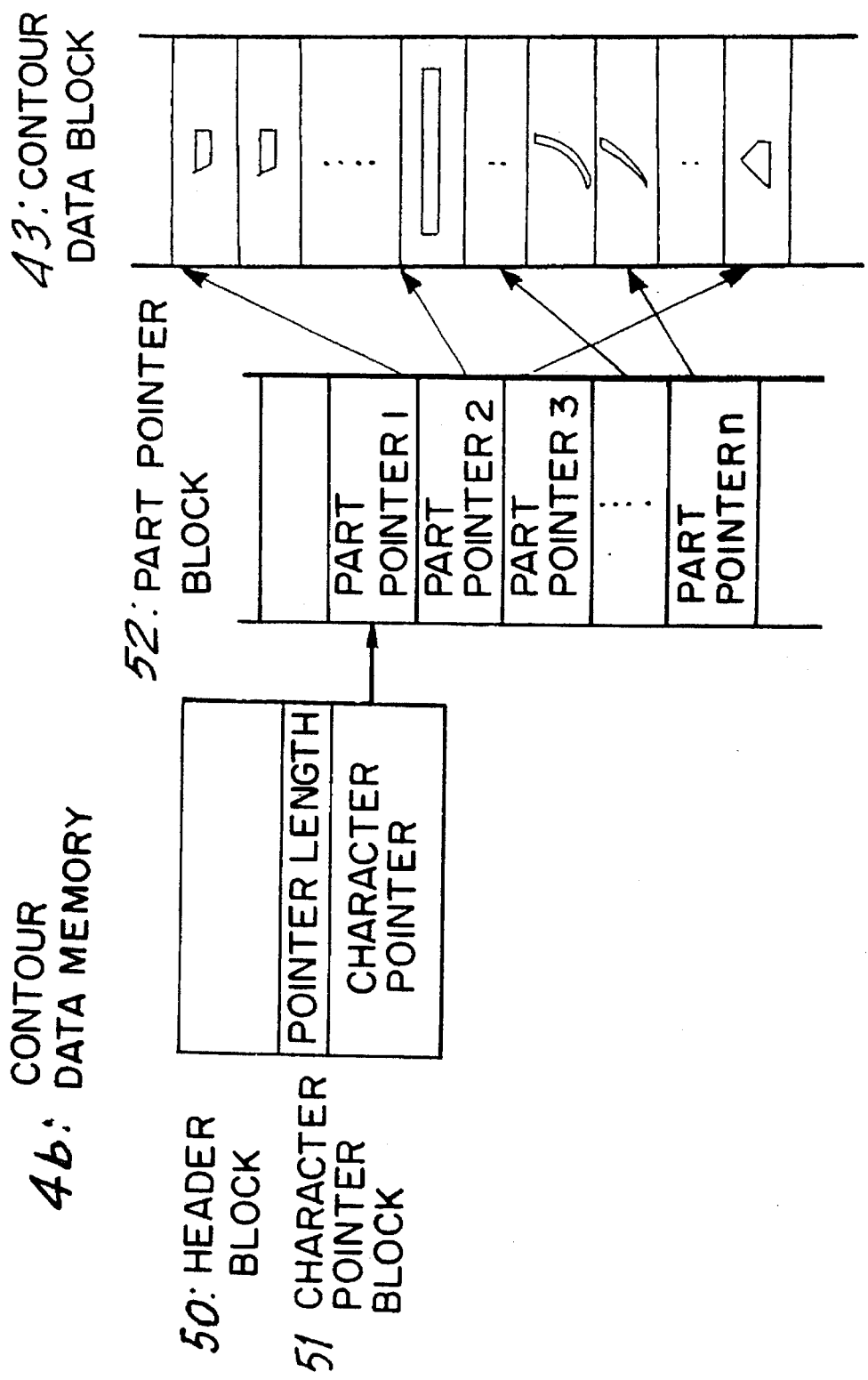
FIG. 6 is a structural diagram of the contour data memory in the font memory according to this modification.
Figure 7:
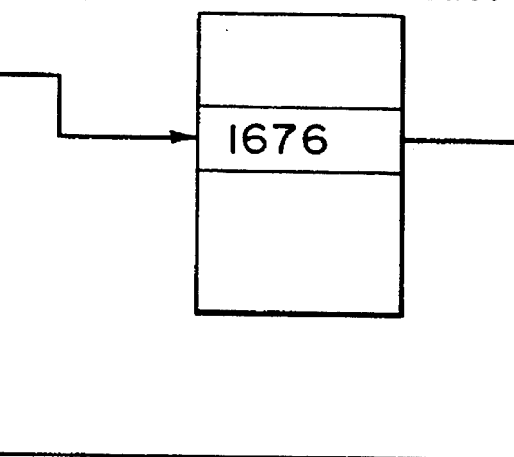
FIG. 7 is a diagram for explaining the operation of this modification.
Figure 7:
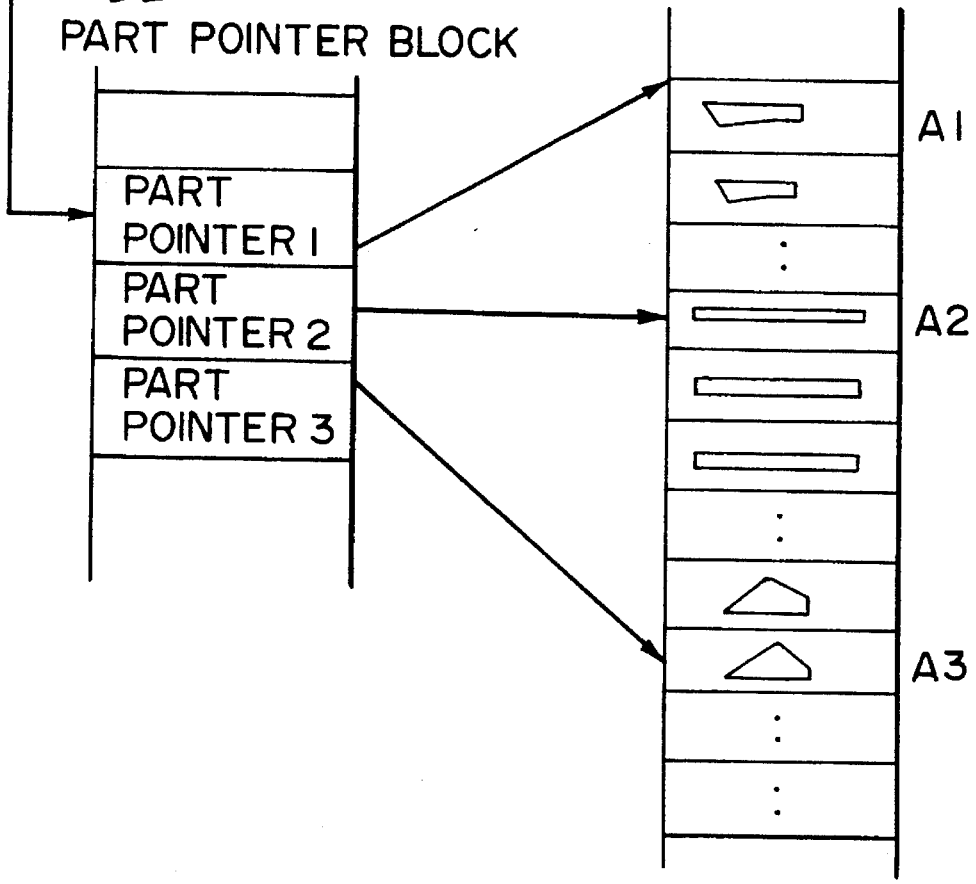
Figure 8:
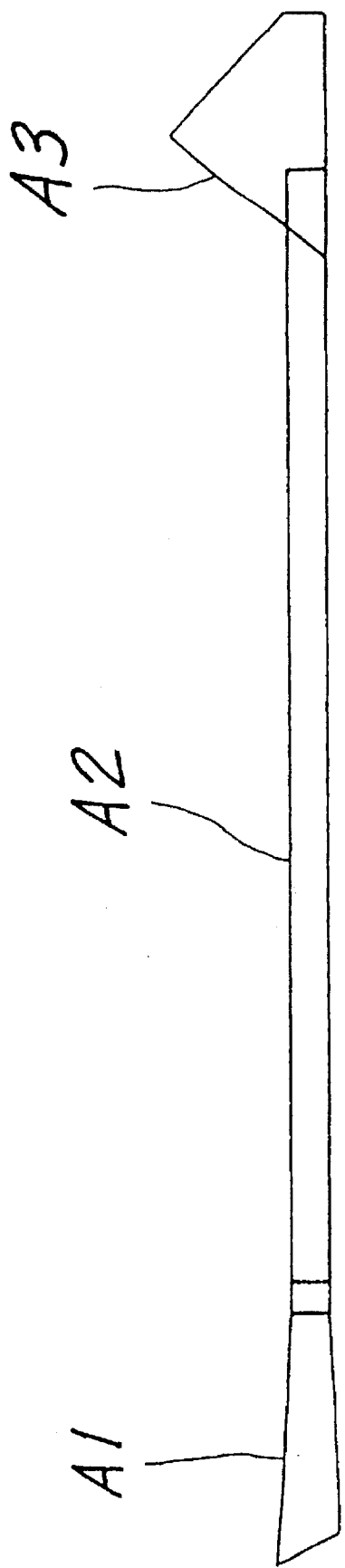
FIG. 8 is a diagram for explaining a character patter.
Figure 9:
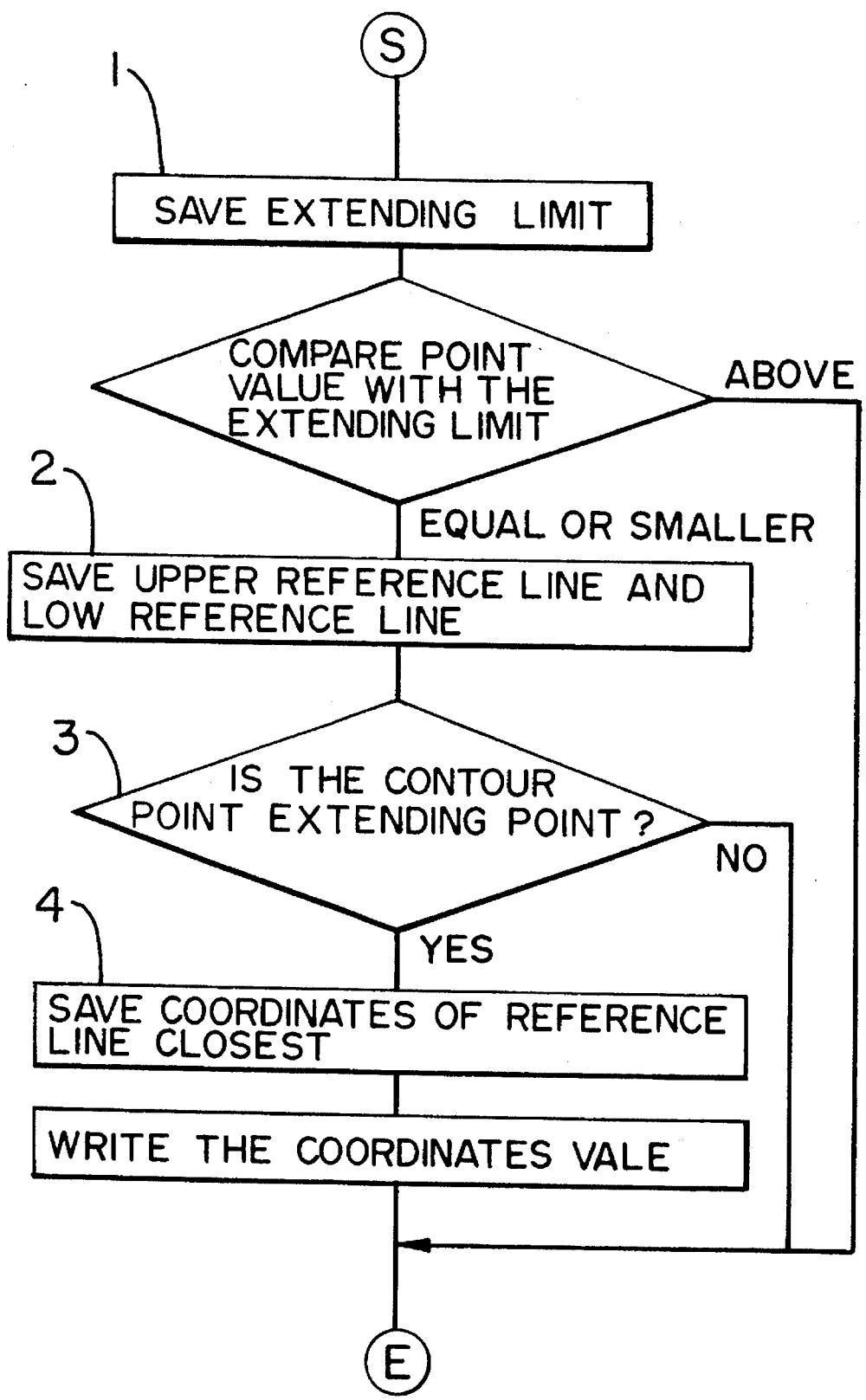
FIG. 9 is a flowchart of a character developing process of this modification.

FIGS. 5 and 6 are structural diagrams of a modification of the font memory, FIG. 7 is a diagram for explaining the operation of this modification, FIG. 8 is an explanatory diagram of a character patter, and FIG. 9 is a flowchart of a character developing process of this modification.

The description will now be given with reference to the case where a character is broken down in a hierarchical structure to elements constituting that character, each element to strokes constituting that element, and each stroke to parts corresponding to the stroking start portion, stroking end portion, etc.

Further, in this description it will be explained that in order to reduce the amount of data, the font memory 4 comprises a structure data memory 4a in FIG. 5 for storing the hierarchical structures and characteristic data of characters, and a contour data memory 4b for storing contour data of each character broken down to strokes or parts.

As shown in FIG. 5, the structure data memory 4a includes a header block 44 where the type of a character set (Mincho, Gothic, etc.) and common data, such as the prepared date, are stored, a character pointer block 45 for searching for target data based on the character code, an element pointer block 46 which indicates broken-down elements, such as the left-hand radical and right-hand radical, and an element directory block 47 which describes what structure each element has.

The element directory block 47 includes element blocks 48 each consisting of classification codes for the individual elements and stroke blocks 49 each describing detailed data of strokes that constitute each element. Each stroke block 49 consists of classification codes of the individual strokes, and part blocks each describing data of parts which constitute one stroke (e.g., origin coordinates of each part, or the like as viewed from the character logical coordinate system).

When a character is broken down to parts, for example, the contour data memory 4b has a data structure as shown in FIG. 6. More specifically, the contour data memory 4b includes a header block 50 where the type of a character set and common data, such as the prepared date, are stored, a character pointer block 51 for searching for target data based on the character code, a part pointer block 52 for searching for images of parts constituting the designated character, and a contour data block 43 describing part images as contour lines.

The structure of this contour data block 43 is the same as the above-described structure shown in FIG. 3, and extending-portion data and relative coordinates of individual contour points are stored in this block 43. The relative coordinates of each part, different from the absolute coordinates of the logical coordinate system in FIG. 3, are the coordinates of relative positions from the origin defined by the coordinates of that part. The reference line data is set by providing a reference line flag, which indicates a reference line, to a contour point or contour points that define the reference line.

Such a memory structure allows the structure data memory 4a to have original coordinates of the individual parts as common typeface data, not typeface by typeface. Therefore, the contour data block 43 of the contour data memory 4b has only to store coordinates of relative positions from the origin of each part which varies from one typeface to another, thus eliminating the need for the absolute coordinates of the logical coordinate system. Therefore, the origin of each part can be shared by a plurality of typefaces, thus reducing the memory capacity accordingly. What is more, the individual parts in the contour data block 43 can be shared by a plurality of typefaces and a plurality of characters, thus ensuring further reduction of the memory capacity.

A description will now be given of the operation of obtaining contour data for a Mincho Kanji character "Ichi" shown in FIG. 8, for example, from the font memory 4 with reference to FIGS. 5 and 7. As shown in FIG. 5, the pointer for an element is obtained in the character pointer block 45 of the structure data memory 4a of the font memory 4 based on the character code "1676" of the Kanji character "Ichi." Further, the pointer for the element block 48 where structure data is stored is obtained in the element pointer block 46.

Data about one stroke constituting the Kanji character "Ichi" is described in the stroke block 49 next to the classification code of the element in the element block 48.

The type of a part and the coordinates of a common start point of that part expressed in the logical coordinate system are stored in each of the part blocks located in the stroke block 49. This example shows the data laid out in the stroking order of the character, namely, a stroking start portion A1, a straight line portion A2 and a stroking end portion A3 in FIG. 8. Accordingly, three parts and the coordinates of the common absolute position of the individual parts are obtained from the structure data memory 4a, based on the character code of the Kanji character "Ichi."

Similarly, the extending-portion limit is obtained from the header block 50 in the contour data memory 4b as shown in FIG. 7. Then, the pointer for the part pointer block 52 is obtained from the character pointer block 51 based on the character code "1676" of the Kanji character "Ichi" and the associated contour data is obtained from the contour data block 43 in the part pointer block 52. In this example, the contour data, the extending-portion data and the reference line flags of the aforementioned three parts of the character "Ichi," the stroking start portion A1, straight line portion A2 and stroking end portion A3, are read out.

Those processes are executed by the character developing block 3. The character developing block 3 adds the common absolute position of each part read from the structure data memory 4a and the relative positional coordinates of each part read from the contour data memory 4b together to obtain the absolute value coordinates of the individual contour points of each part. The absolute position coordinates become the same as the logical coordinates of the individual contour points shown in FIG. 3.

Then, the character developing block 3 causes the enlarging/reducing circuit 30 to enlarge or reduce the contour data to contour data for the designated character size. As the reduction factor (character point value) of 1/15 in the X direction and 1/19 in the Y direction are specified in the example in FIG. 4, the contour coordinates of the contour point a become X=37/15=2.4 and Y=527/19=27.6. Similarly, the logical coordinates of the other contour points will be converted to corresponding contour coordinates for the designated character size as shown in FIG. 4A.

The conversion results are sent to the hinting block 31. The hinting block 31 store the X and Y coordinates of the individual contour points shown in FIG. 4A in a table.

The contents of this table are as follows.

contour point a X=2.4 Y=27.6 contour point b X=11.1 Y=27.1 contour point c X=12.1 Y=27.1 contour point d X=3.7 Y=25.4 contour point e X=11.1 Y=25.7 contour point f X=12.1 Y=25.7

The character developing block 3 then proceeds to the hinting process shown in FIG. 9.

(S1) After the extending-portion limit in the contour data memory 4b is saved, this limit is compared with the designated character point value. When the designated character point value is above the extending-portion limit (character point), no compensation is necessary so that the hinting process will be terminated to proceed to the rounding process.

(S2) When the designated character point value is equal to or smaller than the extending-portion limit (character point), compensation is needed and the converted coordinates of the contour point c of the upper reference line and those of the contour point f of the lower reference line obtained from the contour data memory 4b are saved.

(S3) Next, the directions (X or Y) of the contour points of the extending portion are obtained by referring to the extending-portion flags of the coordinates of the individual contour points.

(S4) Then, the coordinates of the extending portion at the two contour points a and d in question are replaced with the coordinates of the upper reference line or the lower reference line, whichever is the closest. In the example shown in FIG. 4A, as the extending portion extends in the Y direction at the contour point a, the Y coordinate of the contour point a (=27.6) is compared with the Y coordinate of the upper reference line (=27.1) and the Y coordinate of the lower reference line (=25.7) and is replaced with the closest coordinate. Therefore, the Y coordinate of the contour point a, Y=27.6, is replaced with the Y coordinate of the upper reference line, Y=27.1.

Through this replacing process, the converted coordinates of the individual points a to f take the following values as apparent from FIG. 4B, and are written as coordinate values.

contour point a X=2.4 Y=27.1 contour point b X=11.1 Y=27.1 contour point c X=12.1 Y=27.1 contour point d X=3.7 Y=25.7 contour point e X=11.1 Y=25.7 contour point f X=12.1 Y=25.7

The hinting block 31 executes the replacing processing in the above manner and performs the width adjustment and other necessary processing to improve the character quality of the bit map image. Then, the hinting block 31 performs rounding on the coordinates of the individual contour points. The integer coordinates of the individual contour points after rounding become as follows, which are shown in FIG. 4C.

contour point a X=2 Y=27 contour point b X=11 Y=27 contour point c X=12 Y=27 contour point d X=4 Y=26 contour point e X=11 Y=26 contour point f X=12 Y=26

The integer coordinates of those contour points are sent to the drawing circuit 6. The drawing circuit 6 performs drawing to fill inside the contour line, completing the bit map image as shown in FIG. 4D.

It is apparent that this modification has the same advantages as the above-described embodiment. Since the reference line data is given by the designation of contour points, not in the form of coordinates, the memory capacity can be reduced by the otherwise required amount of the coordinate values. This modification further eliminates the need for computation for converting the reference line coordinates to coordinates for the designated character size. In addition, the font memory is separated into a structure data memory and a contour data memory, which also contributes to reduction of the memory capacity.

Figures 10A, 10B, 10C:
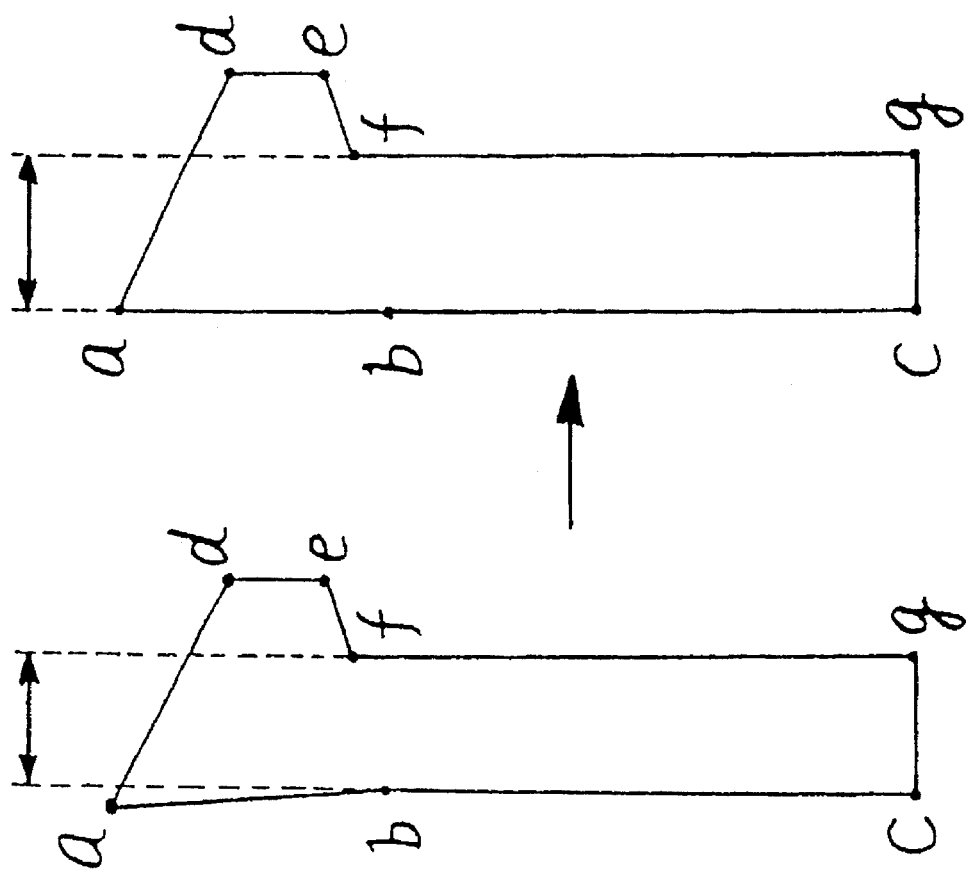
FIG. 10 is explanatory diagrams of another modification of the present invention.
Figure 11A:
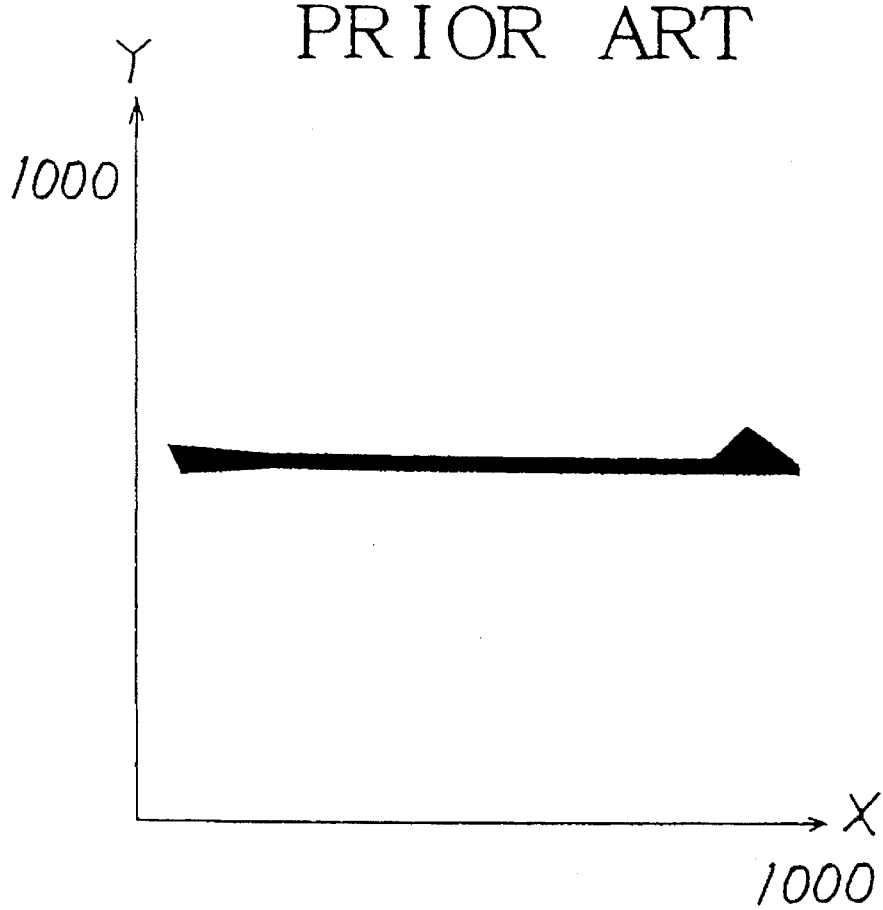
FIGS. 11 and 12 are explanatory diagrams of prior art.
Figure 11B:
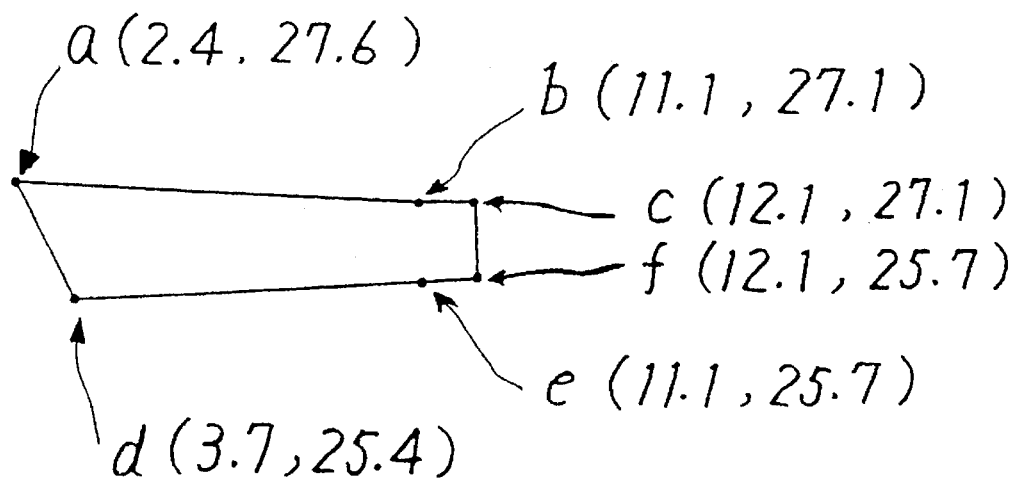
Figure 12A:
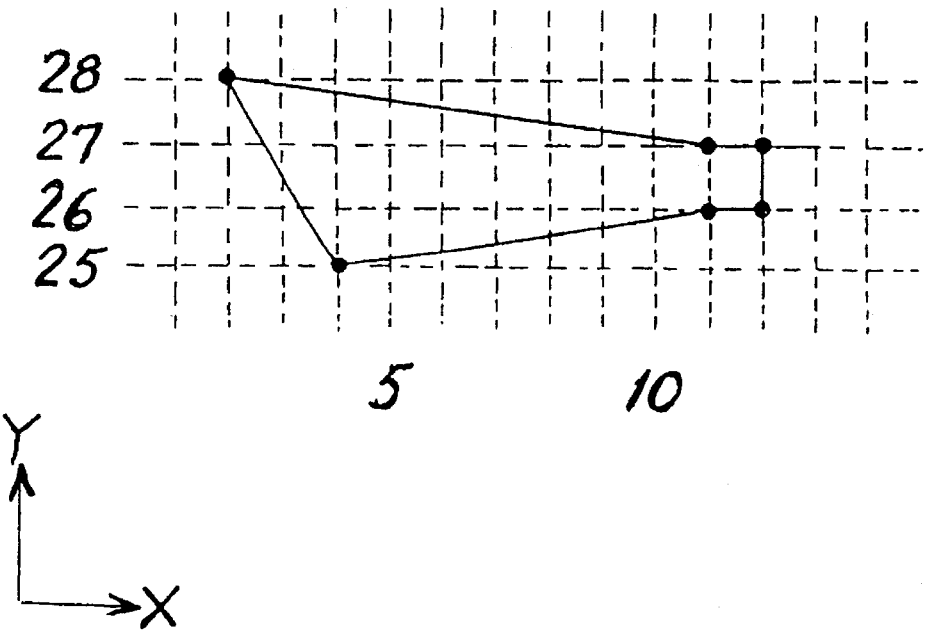
Figure 12B:
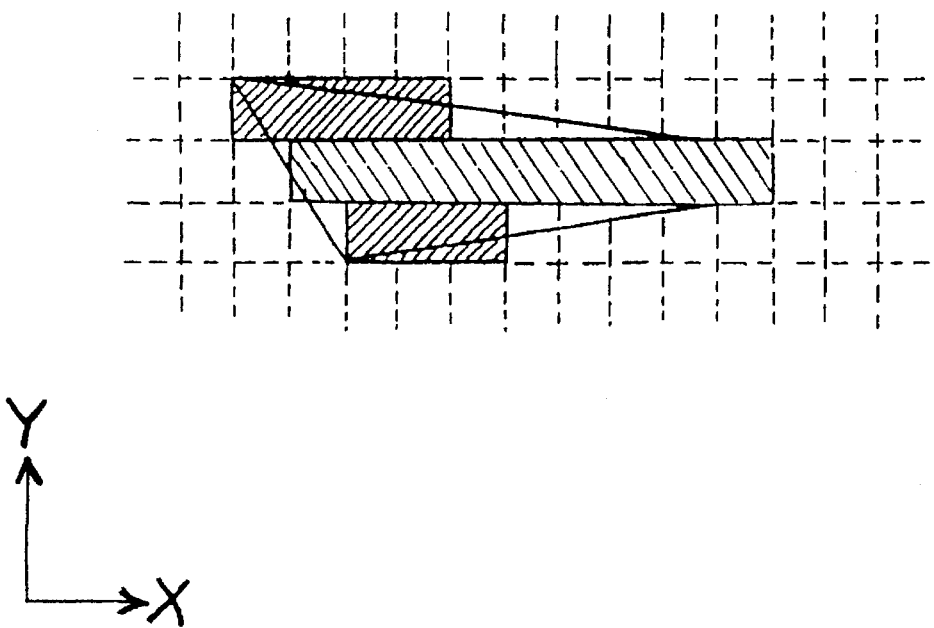

FIGS. 10A through 10C are explanatory diagrams for another modification of the present invention.

While the foregoing description of the embodiment and modification has been given with reference to horizontal parts or a horizontal stroke, the second modification is designed to cope with vertical parts or a vertical stroke too.

In this example, one part is expressed by contour points a to g as shown in FIG. 10A. The point a is the contour point of the extending portion. With the reference lines defined by the contour points b and f, therefore, the contour point a can be replaced with a point on the reference line defined by the contour point b as shown in FIG. 10B. The resultant bit map image will have an extending portion which is not too emphasized, as shown in FIG. 10C.

Besides the above embodiment and two modifications, the present invention may be modified as follows. First, although the foregoing description has been given with reference to the Mincho Kanji character "Ichi," this invention can be adapted to cope with characters having parallel horizontal strokes, parallel vertical strokes and so forth. Secondly, this invention can be adapted to cope with oblique strokes as well as the above-discussed horizontal strokes and vertical strokes. In this case, a reference line is an oblique line connecting two contour points and any contour point of an extending portion will be replaced with a point on this oblique line. Thirdly, although the font memory has been explained as a part-segmenting type, it may be a stroke-segmenting type.

Although only one embodiment and two modifications of the present invention have been described herein, it should be apparent to those skilled in the art that the present invention may be embodied in many other specific forms without departing from the spirit or scope of the invention.

In short, according to the present invention, because the coordinates of the contour points of an extending portion constituting a character are replaced with points on reference lines, the resultant character image will not have an extending portion that is too emphasized. Even with the use of outline data, therefore, the character pattern of a character of a small size will not be so different from the image of the original character, thus improving the character quality.

What is claimed is:

1. A character generating method for generating a bit map image of a character of a designated size from outline data of said character, said method comprising the steps of:

converting each piece of outline coordinate data expressing a contour line of said character in logical coordinates, into coordinates of said designated size;

replacing converted coordinates of designated points on said contour line with coordinates on a reference line determined by coordinates of specific reference points;

rounding said individual converted coordinates of said contour and converting said rounded coordinates line into physical coordinates expressed by integers; and generating a bit map image of said character from said converted physical coordinates.

2. The character generating method according to claim 1, further comprising a step of determining whether or not said replacing step is to be executed in accordance with said designated size.

3. The character generating method according to claim 2, wherein said determining step compares said designated size with a predetermined character size.

4. The character generating method according to claim 1, wherein said designated points in question in said replacing step are points of an extending portion on said contour line of said character.

5. The character generating method according to claim 4, wherein said designated points in question in said replacing step are contour points of a horizontal stroke, a vertical stroke or an oblique stroke of said character.

6. The character generating method according to claim 1, wherein in said replacing step, said reference line is defined by a specific point, as a reference point, on a stroke or a part to which said designated points belong.

7. The character generating method according to claim 2, wherein said designated points in question in said replacing step are points of an extending portion on said contour line of said character.

8. The character generating method according to claim 7, wherein said designated points in question in said replacing step are contour points of a horizontal stroke, a vertical stroke or an oblique stroke of said character.

9. The character generating method according to claim 2, wherein in said replacing step, said reference line is defined by a specific point, as a reference point, on a stroke or a part to which said designated points belong.

10. The character generating method according to claim 3, wherein said designated points in question in said replacing step are points of an extending portion on said contour line of said character.

11. The character generating method according to claim 10, wherein said designated points in question in said replacing step are contour points of a horizontal stroke, a vertical stroke or an oblique stroke of said character.

12. The character generating method according to claim 3, wherein in said replacing step, said reference line is defined by a specific point, as a reference point, on a stroke or a part to which said designated points belong.

13. The character generating method according to claim 4, wherein in said replacing step, said reference line is defined by a specific point, as a reference point, on a stroke or a part to which said designated points belong.

14. The character generating method according to claim 5, wherein in said replacing step, said reference line is defined by a specific point, as a reference point, on a stroke or a part to which said designated points belong.

15. A character generating apparatus for generating a bit map image of a character of a designated size from outline data of said character, said apparatus comprising:

a font memory for storing outline font data expressing a contour line of said character in coordinates;

a character developing circuit for reading each piece of outline coordinate data from said font memory, converting said read outline coordinate data into coordinates of a designated size, replacing converted coordinates of designated points on said contour line with coordinates on a reference line determined by coordinates of specific reference points, rounding said individual converted coordinates of said contour line, and converting said rounded coordinates into physical coordinates expressed by integers; and a drawing circuit for generating a bit map image of said character from said converted physical coordinates.

16. The character generating apparatus according to claim 15, wherein said character developing circuit determines whether or not to execute a replacing process in accordance with said designated size.

17. The character generating apparatus according to claim 16, wherein said font memory stores a character size limit; and said character developing circuit compares said designated size with said character size limit to determine whether or not to execute said replacing process.

18. The character generating apparatus according to claim 15, wherein said font memory stores a flag at a location corresponding to a point of an extending portion on said contour line of a character, said flag indicating a point to be replaced in a replacing process; and said character developing circuit treats a contour line with said flag as a replacing target.

19. The character generating apparatus according to claim 18, wherein said font memory stores a flag at a location corresponding to a contour point on a horizontal stroke, a vertical stroke or an oblique stroke of said character, said flag indicating a point to be replaced in a replacing process; and said character developing circuit treats said contour line with said flag as a replacing target.

20. The character generating apparatus according to claim 15, wherein said font memory stores, as reference point data, coordinates of a specific point of a stroke or a part to which said designated points belong; and said character developing circuit converts said reference point data to coordinates of said designated size to accomplish replacement with said coordinates on said reference line.

21. The character generating apparatus according to claim 15, wherein said font memory stores a reference point flag at coordinates of a specific point of a stroke or a part to which said designated points belong; and said character developing circuit accomplishes replacement with said coordinates on said reference line based on converted coordinates of a point with said reference point flag.

22. The character generating apparatus according to claim 16, wherein said font memory stores a flag at a location corresponding to a point of an extending portion on said contour line of a character, said flag indicating a point to be replaced in a replacing process; and said character developing circuit treats a contour line with said flag as a replacing target.

23. The character generating apparatus according to claim 22, wherein said font memory stores a flag at a location corresponding to a contour point on a horizontal stroke, a vertical stroke or an oblique stroke of said character, said flag indicating a point to be replaced in a replacing process; and said character developing circuit treats said contour line with said flag as a replacing target.

24. The character generating apparatus according to claim 16, wherein said font memory stores, as reference point data, coordinates of a specific point of a stroke or a part to which said designated points belong; and said character developing circuit converts said reference point data to coordinates of said designated size to accomplish replacement with said coordinates on said reference line.

25. The character generating apparatus according to claim 16, wherein said font memory stores a reference point flag at coordinates of a specific point of a stroke or a part to which said designated points belong; and said character developing circuit accomplishes replacement with said coordinates on said reference line based on converted coordinates of a point with said reference point flag.

26. The character generating apparatus according to claim 17, wherein said font memory stores a flag at a location corresponding to a point of an extending portion on said contour line of a character, said flag indicating a point to be replaced in a replacing process; and said character developing circuit treats a contour line with said flag as a replacing target.

27. The character generating apparatus according to claim 26, wherein said font memory stores a flag at a location corresponding to a contour point on a horizontal stroke, a vertical stroke or an oblique stroke of said character, said flag indicating a point to be replaced in a replacing process; and said character developing circuit treats said contour line with said flag as a replacing target.

28. The character generating apparatus according to claim 17, wherein said font memory stores, as reference point data, coordinates of a specific point of a stroke or a part to which said designated points belong; and said character developing circuit converts said reference point data to coordinates of said designated size to accomplish replacement with said coordinates on said reference line.

29. The character generating apparatus according to claim 17, wherein said font memory stores a reference point flag at coordinates of a specific point of a stroke or a part to which said designated points belong; and said character developing circuit accomplishes replacement with said coordinates on said reference line based on converted coordinates of a point with said reference point flag.

30. A character generating method for generating a bit map image of a character of a designated size from outline data of said character, the method comprising the steps of:

providing a plurality of outline coordinate data, the plurality of outline coordinate data expressing contour lines of said character, each of the outline coordinate data being expressed in a logical coordinate;

converting each of the outline coordinate data in the logical coordinate into coordinates of said designated size;

providing a reference line determined by at least one of the plurality of outline coordinate data in a logical coordinate, the reference line being expressed by coordinates of the outline coordinate data in the logical coordinate;

converting the coordinates of the reference line into coordinates of said designated size;

replacing the converted coordinates of the outline coordinate data with the converted coordinates of the reference line;

rounding the converted coordinates of the reference line into physical coordinates expressed by integers; and generating a bit map image of said character from said converted physical coordinates.

31. The character generating method according to claim 30, further comprising a step of determining whether or not said replacing step is to be executed in accordance with said designated size.

32. The character generating method according to claim 31, wherein said determining step compares said designated size with a predetermined character size.

33. The character generating method according to claim 30, wherein designated points to which said converted coordinates in said replacing step belong are points of an extending portion of said contour line of said character.

34. The character generating method according to claim 33, wherein said designated points to which said converted coordinates in said replacing step belong are contour points of a horizontal stroke, a vertical stroke or an oblique stroke of said character.

35. The character generating method according to claim 30, wherein in said replacing step, said reference line is defined by a specific point, as a reference point, on a stroke or a part on which designated points to which said converted coordinates belong are provided.

36. The character generating method according to claim 31, wherein designated points to which said converted coordinates in said replacing step belong are points of an extending portion on said contour line of said character.

37. The character generating method according to claim 36, wherein said designated points to which said converted coordinates in said replacing step belong are contour points of a horizontal stroke, a vertical stroke or an oblique stroke of said character.

38. The character generating method according to claim 31, wherein in said replacing step, said reference line is defined by a specific point, as a reference point, on a stroke or a part on which designated points to which said converted coordinates belong are provided.

39. The character generating method according to claim 32, wherein designated points to which said converted coordinates in said replacing step belong are points of an extending portion on said contour line of said character.

40. The character generating method according to claim 39, wherein said designated points in said replacing step are contour points of a horizontal stroke, a vertical stroke or an oblique stroke of said character.

41. The character generating method according to claim 32, wherein in said replacing step, said reference line is defined by a specific point, as a reference point, on a stroke or a part on which designated points to which said converted coordinates belong, are provided.

42. The character generating method according to claim 33, wherein in said replacing step, said reference line is defined by a specific point, as a reference point, on a stroke or a part to which said designated points belong.

43. The character generating method according to claim 34, wherein in said replacing step, said reference line is defined by a specific point, as a reference point, on a stroke or a part to which said designated points belong.

44. A character generating apparatus for generating a bit map image of a character of a designated size from outline data of said character, the apparatus comprising:

a font memory for providing a plurality of outline coordinate data, the plurality of outline coordinate data expressing contour lines of said character, each of the outline coordinate data being expressed in a logical coordinate;

a character developing circuit for converting each of the outline coordinate data in the logical coordinate into coordinates of said designated size, providing a reference line determined by at least one of the plurality of outline coordinate data in a logical coordinate, the reference line being expressed by coordinates of the outline coordinate data in the logical coordinate, converting the coordinates of the reference line into coordinates of said designated size, replacing the converted coordinates of the outline coordinate data with the converted coordinates of the reference line and rounding the converted coordinates of the reference line into physical coordinates expressed by integers; and a drawing circuit for generating a bit map image of said character from said converted physical coordinates.

45. The character generating apparatus according to claim 44, wherein said character developing circuit determines whether or not to execute a replacing process in accordance with said designated size.

46. The character generating apparatus according to claim 45, wherein said font memory stores a character size limit; and said character developing circuit compares said designated size with said character size limit to determine whether or not to execute said replacing process.

47. The character generating apparatus according to claim 44, wherein said font memory stores a flag at a location corresponding to a point of an extending portion on said contour line of a character, said flag indicating a point to be replaced in a replacing process; and said character developing circuit treats a contour line with said flag as a replacing target.

48. The character generating apparatus according to claim 47, wherein said font memory stores a flag at a location corresponding to a contour point on a horizontal stroke, a vertical stroke or an oblique stroke of said character, said flag indicating a point to be replaced in a replacing process; and said character developing circuit treats said contour line with said flag as a replacing target.

49. The character generating apparatus according to claim 44, wherein said font memory stores, as reference point data, coordinates of a specific point of a stroke or a part to which said designated points belong; and said character developing circuit converts said reference point data to coordinates of said designated size to accomplish replacement with said coordinates on said reference line.

50. The character generating apparatus according to claim 44, wherein said font memory stores a reference point flag at coordinates of a specific point of a stroke or a part to which said designated points belong; and said character developing circuit accomplishes replacement with said coordinates on said reference line based on converted coordinates of a point with said reference point flag.

51. The character generating apparatus according to claim 45, wherein said font memory stores a flag at a location corresponding to a point of an extending portion on said contour line of a character, said flag indicating a point to be replaced in a replacing process; and said character developing circuit treats a contour line with said flag as a replacing target.

52. The character generating apparatus according to claim 51, wherein said font memory stores a flag at a location corresponding to a contour point on a horizontal stroke, a vertical stroke or an oblique stroke of said character, said flag indicating a point to be replaced in a replacing process; and said character developing circuit treats said contour line with said flag as a replacing target.

53. The character generating apparatus according to claim 45, wherein said font memory stores, as reference point data, coordinates of a specific point of a stroke or a part to which said designated points belong; and said character developing circuit converts said reference point data to coordinates of said designated size to accomplish replacement with said coordinates on said reference line.

54. The character generating apparatus according to claim 45, wherein said font memory stores a reference point flag at coordinates of a specific point of a stroke or a part to which said designated points belong; and said character developing circuit accomplishes replacement with said coordinates on said reference line based on converted coordinates of a point with said reference point flag.

55. The character generating apparatus according to claim 46, wherein said font memory stores a flag at a location corresponding to a point of an extending portion on said contour line of a character, said flag indicating a point to be replaced in a replacing process; and said character developing circuit treats a contour line with said flag as a replacing target.

56. The character generating apparatus according to claim 55, wherein said font memory stores a flag at a location corresponding to a contour point on a horizontal stroke, a vertical stroke or an oblique stroke of said character, said flag indicating a point to be replaced in a replacing process; and said character developing circuit treats said contour line with said flag as a replacing target.

57. The character generating apparatus according to claim 46, wherein said font memory stores, as reference point data, coordinates of a specific point of a stroke or a part to which said designated points belong; and said character developing circuit converts said reference point data to coordinates of said designated size to accomplish replacement with said coordinates on said reference line.

58. The character generating apparatus according to claim 46, wherein said font memory stores a reference point flag at coordinates of a specific point of a stroke or a part to which said designated points belong; and said character developing circuit accomplishes replacement with said coordinates on said reference line based on converted coordinates of a point with said reference point flag.

\* \* \* \* \*